J. HERRMANN.
HILLSIDE SPRAYING WAGON.
APPLICATION FILED AUG. 29, 1912.
1,058,699.
Patented Apr. 8, 1913.
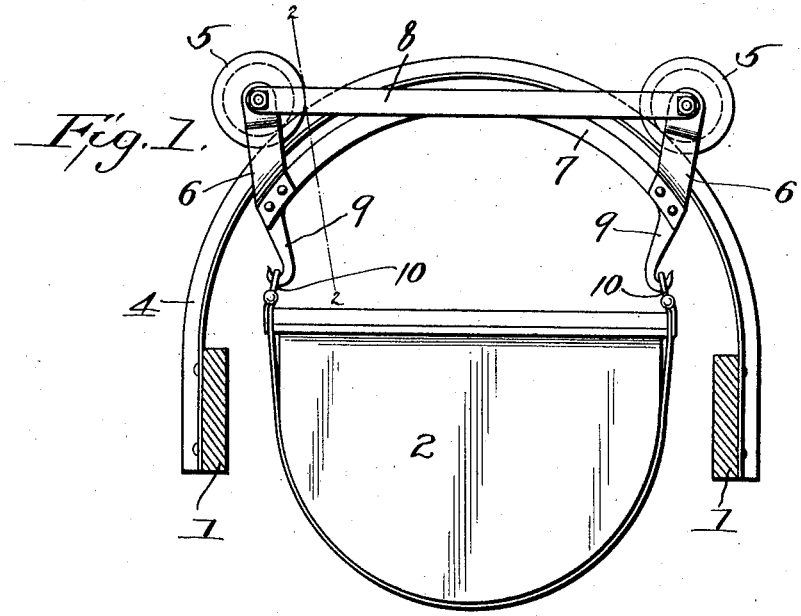
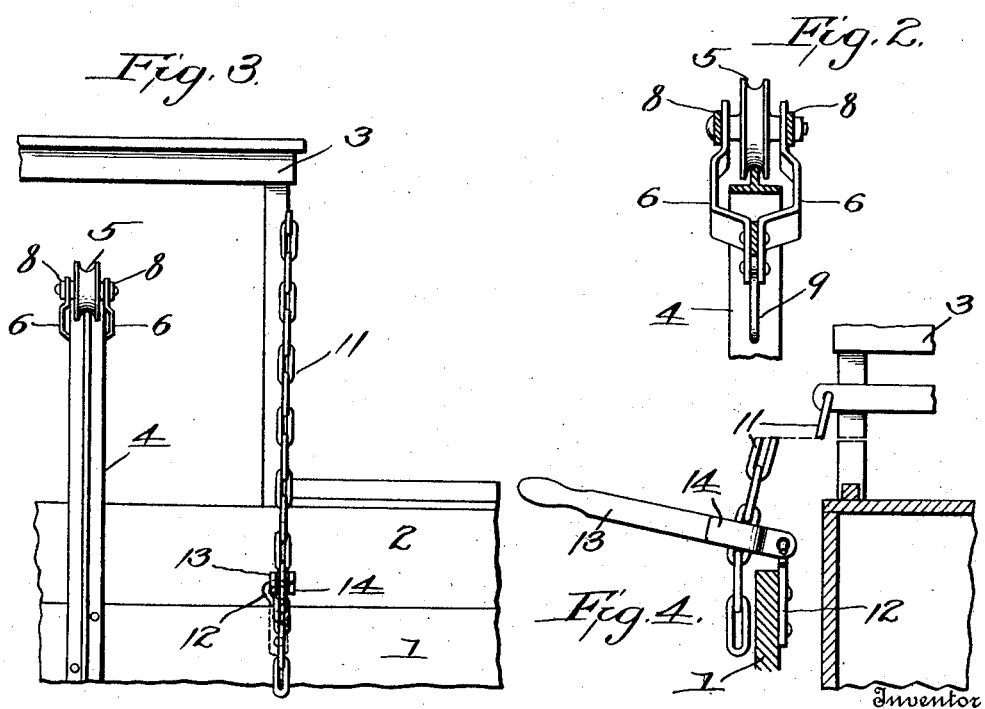
Witnesses
Oliver W. Holmes
E. B. McBath
Inventor
John Herrmann
By Chas. E. Brock
Attorney

UNITED STATES PATENT OFFICE.

JOHN HERRMANN, OF CHARLOTTESVILLE, VIRGINIA.

HILLSIDE SPRAYING-WAGON.

1,058,699.  Specification of Letters Patent.  Patented Apr. 8, 1913.

Application filed August 29, 1912. Serial No. 717,755.

*To all whom it may concern:*

Be it known that I, JOHN HERRMANN, a citizen of the United States, residing at Charlottesville, in the county of Albemarle and the State of Virginia, have invented a new and useful Hillside Spraying-Wagon, of which the following is a specification.

The object of this invention is to permit driving of a spraying wagon along the side of a slope without danger of the wagon overturning, and this object is accomplished by hanging the tank within the wagon frame in such manner that the weight can be shifted so as to throw it toward the upper side.

The invention consists of the novel features of construction hereinafter pointed out, in the description and claims, and shown in the drawings in which:

Figure 1 is an end view of the tank, the wagon box or frame being in section. Fig. 2 is a section on the line 2—2 of Fig. 1. Fig. 3 is a side elevation of a part of the rear portion of the device. Fig. 4 is a detail sectional view indicating the manner of gripping an operating chain.

In these drawings 1 represents a wagon frame or box which is of course mounted on suitable wheels, not shown. A tank 2 is suspended in the frame 1 and the rear portion of the tank supports a cab 3 in which a suitable pump or engine, not shown, may be located. Curved metal arches 4 the ends of which are supported by the frame 1 serve both as supports for the tank 2, and also as trackways, the arches being T-shaped in cross section as shown in Fig. 2. Upon each arch a pair of grooved wheels 5 is adapted to travel, said wheels carrying hangers 6, each pair of hangers being connected by a curved bar 7. A straight brace bar also connects each wheel of a pair, thus keeping them from spreading. Hooks 9 are carried by the hangers 6 and engage links 10 connected to the tank 2. For shifting the wheels along the arches or tracks a chain 11 is connected to the side of the cab 3, and a hook 12 is carried by the frame 1. These parts may be duplicated on opposite sides of the wagon.

A lever 13 has a fork or chain clutch member 14 and an eye adapted to engage the hook 12. By engaging the lever with the hook and then with the chain and drawing downwardly upon the lever the wheels will be caused to ride on the track formed by the arches, thereby enabling me to throw the weight toward the higher side when the device is moved along the side of a slope, with the wagon wheels on one side on lower ground than those on the other.

What I claim is:—

1. In a device of the kind described, a frame, transverse arches carried by the frame, wheels adapted to travel on the arches, hangers carried by the wheels, a curved bar connected to said hangers and a tank detachably hung from said hangers, and freely movable within said frame.

2. A frame, curved transversely arranged trackways carried by the frame, a pair of wheels movable on each trackway, means for connecting the wheels of each pair, hangers connected to the wheels, a tank supported by said hangers, a cab on the frame, and a depending chain connected to said cab and affording means for causing said wheels to shift along the track.

JOHN HERRMANN.

Witnesses:
 H. E. DINWIDDIE,
 R. S. J. STERLING.

---

Copies of this patent may be obtained for five cents each, by addressing the "Commissioner of Patents, Washington, D. C."